United States Patent [19]
Hoffmann

[11] 4,336,095
[45] Jun. 22, 1982

[54] MACHINE FOR LABELING BODIES AND SHOULDERS OF CONTAINERS

[75] Inventor: Wolfgang Hoffmann, Turlock, Calif.

[73] Assignee: B & H Manufacturing Company, Inc., Ceres, Calif.

[21] Appl. No.: 93,232

[22] Filed: Nov. 13, 1979

[51] Int. Cl.[3] ........................ B32B 31/00; B65C 9/40; B65C 9/06; B44C 5/00

[52] U.S. Cl. .................................... 156/361; 156/362; 156/447; 156/458; 156/215; 156/235; 156/542; 156/DIG. 31; 156/DIG. 37

[58] Field of Search ............... 156/458, 215, 490, 493, 156/469, 446, 185, 187, 202, 214, DIG. 11, DIG. 12, DIG. 13, DIG. 31, DIG. 37, DIG. 42, 542, 361, 362, 447, 449, 458, 540, 482, 576, 583.8, 583. 91, 215, 238, 235

[56] References Cited

U.S. PATENT DOCUMENTS 2,635,765 4/1953 Fairest et al. ....................... 156/493
3,586,570 6/1971 Solomon et al. .................... 156/458
4,108,709 8/1978 Hoffmann .......................... 156/458
4,108,710 8/1978 Hoffmann .......................... 156/458
4,214,937 7/1980 Geortsen et al. .................. 156/542

FOREIGN PATENT DOCUMENTS 1007006 10/1965 United Kingdom ....... 156/DIG. 37

*Primary Examiner*—Edward C. Kimlin
*Assistant Examiner*—Louis Falasco
*Attorney, Agent, or Firm*—Edward B. Gregg

[57] ABSTRACT

Machine for applying labels to containers having cylindrical bodies and tapered shoulders, comprising a vacuum drum having one or more pairs of suction pads including a lower pad for adhering a body label to be applied to the cylindrical body of a container, such pad being fixed except for rotation with the drum, the upper pad being mounted for tilting about one or two axes to bring it into proper position for applying a label to the tapered shoulder of a container.

5 Claims, 12 Drawing Figures

MACHINE FOR LABELING BODIES AND SHOULDERS OF CONTAINERS

This invention relates to a labeling machine for applying labels to the bodies and to the shoulders of containers which have cylindrical bodies and tapered shoulders or necks. The machine is capable of applying labels to the shoulders alone if that is desired.

In the application of labels to cylindrical containers such as, for example, that shown in my U.S. Pat. No. 4,108,709 it is sufficient to provide a rotating vacuum drum which picks up the labels at a label receiving station as they are supplied to it by a continuous label cutting instrumentality, to transport each label from the label receiving station past a glue applicator which applies a pattern of glue to the label and then to a container feed at which the label is applied to the container and the container is caused to spin to wrap the label around the container. For such purpose, the vacuum drum has on it one or more pads equipped preferably with a resilient surface and also equipped with suction ducts connected with a source of vacuum to grip each label in turn by its leading end, to hold the label on the pad during the transit from the label receiving station to the label applying station and to release the label to the container at the label applying station.

However, where the container has a tapered or conical shoulder or neck above the cylindrical body portion and where it is desired to apply labels to this portion of the container, it is necessary both to tilt each shoulder label into a posture such that it contacts and has the proper position to be applied to the shoulder.

it is advantageous to provide a machine which will apply body labels to the cylindrical bodies of containers and shoulder labels to the tapered or conical shoulders of containers in a single operation without the need to pass the containers through a body labeling station and then through the shoulder labeling station.

Further, it is advantageous to sever the body labels and the shoulder labels from a single continuous length of label stock without having to employ pre-cut labels and/or to sever body labels from one strip of label stock and shoulder labels from another strip of label stock.

It is an object of the present invention to provide a labeling machine satisfying the requirements described above.

It is a further object of the invention to provide a labeling machine which is capable of severing shoulder labels from continuous label stock to the desired shape and dimensions, transporting each severed label past a glue applicator for application of pattern of glue thereto and then tilting each label to the proper position for application to the shoulder of a rotating container at a label applying station.

Yet another object of the invention is to provide a labeling machine capable of severing and handling shoulder labels as described immediately above which is also capable of continuously severing body labels from the same label stock and applying them to the cylindrical bodies of containers simultaneously with severance and application of shoulder labels.

Yet another object is to provide a body and shoulder labeling machine having the attributes discussed above and which is economical in its utilization of label stock in that it minimizes the amount of label stock which is wasted as scrap.

The above and other objects of the invention will be apparent from the ensuing description and the appended claims.

One embodiment of the invention is illustrated by way of example in the accompanying drawings, in which.

Figure 1:
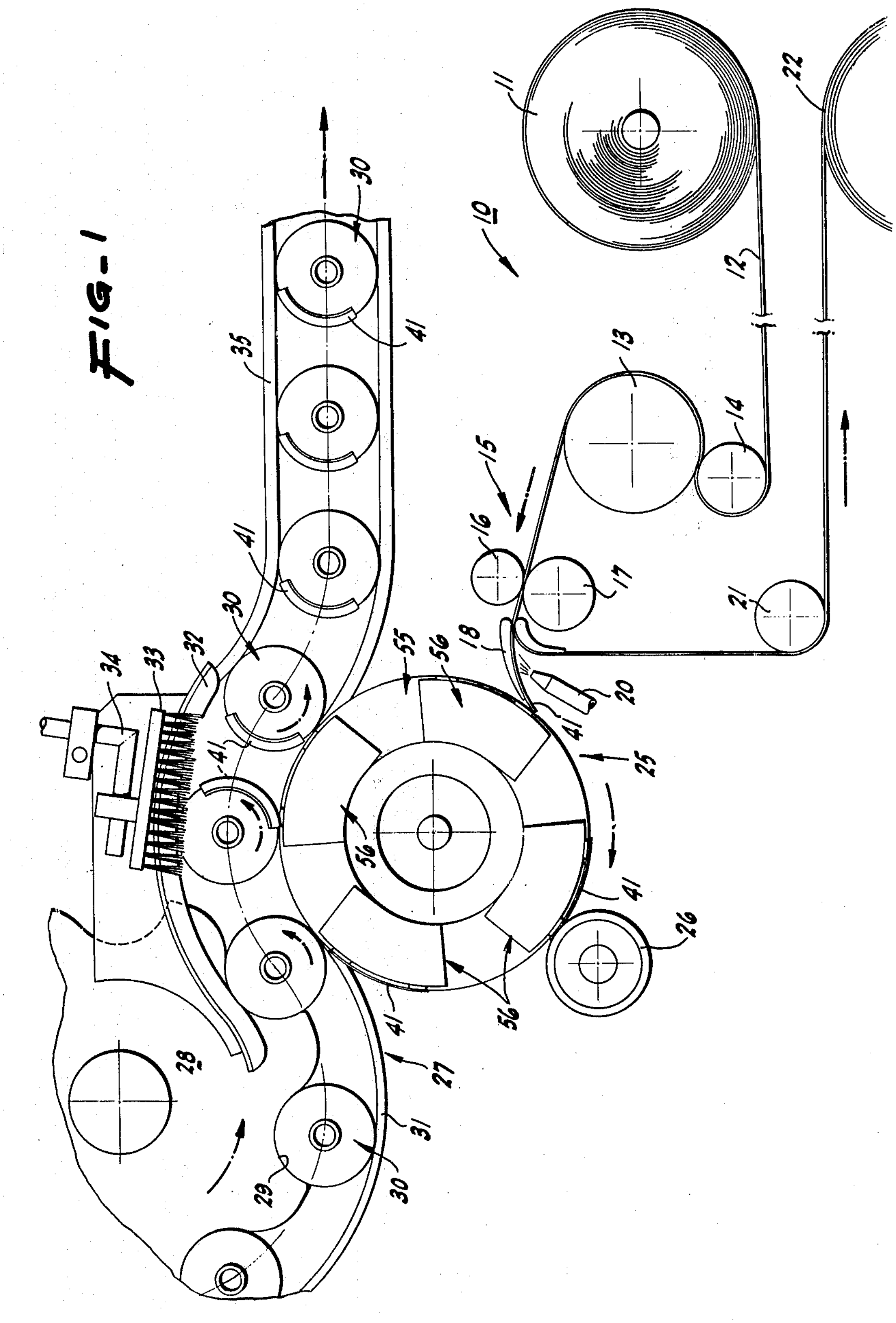
FIG. 1 is an overall, somewhat diagrammatic assembly view of the entire machine.

Referring now to FIG. 1, the machine is generally designated by the reference numeral 10. A roll 11 of label stock 12 is shown, the label stock passing between rollers 13 and 14, one of which is driven and which together constitute the label feed. Also shown is a cutter 15 comprising, for example, a rotary cutter 16 and an anvil roller 17. Guides 18 and 19 and an air jet 20 are also shown to guide the label stock from the cutter to a label drum. Scrap material 12*a* passes over a roller 21 and is rolled up at 22.

The cutter 15 may be a rotary die cutter such as shown in Hoffmann U.S. patent application, Ser. No. 875,891, now U.S. Pat. No. 4,181,555 and Dickey U.S. patent application, Ser. No. 871,554, now U.S. Pat. No. 4,188,843. However, other types of cutter may be used.

Labels are supplied by this feed and cutting mechanism to a vacuum drum 25 which transports the labels from the label receiving station past a glue applicator 26 to a container feed 27. Preferably the peripheral speed of the vacuum drum 25 is such that it is slightly greater than the linear feed of the label stock and the operation of the label feed and the vacuum drum are such in relation to one another that each label (both body label and shoulder label) is gripped by the vacuum drum before it is severed from the label stock. Thus, a pull is exerted on each label before it is severed and there is a slight, predetermined slippage of the label on the surface of the label drum. The glue applicator 26 may be of any well known construction and may apply any of a number of glue patterns, such constructions and patterns being well known in the art. For example, glue may be applied to the leading end and the trailing end of each label whereby the leading end of each label will be adhered to a container by the glue line at its leading end and the label is completely wrapped around the container with the glue line at the trailing end overlapping and adhering to the leading end of the label. Such would be the case for a full-wrap label. Partial-wrap is shown in the present invention and in that case the glue applicator 26 may apply what is known as a "picture frame" glue pattern; that is to say, a glue line may be applied to each end of the label and to each side of the label.

The container feed 27 includes, by way of illustration, a star wheel 28 having pockets 29 in which containers 30 are seated as they are guided by a container guide 31. Each container is guided into a circular path by a curved pad 32 of resilient material suitably mounted on the frame of the machine. A brush 33 is shown mounted on a frame bracket 34 which serves the purpose of contacting, smoothing out and ensuring proper application of the shoulder labels. The fully labeled containers pass out of the machine through a guide 35. Shoulder labels 41 are shown applied to the shoulders of the containers.

Figure 2:
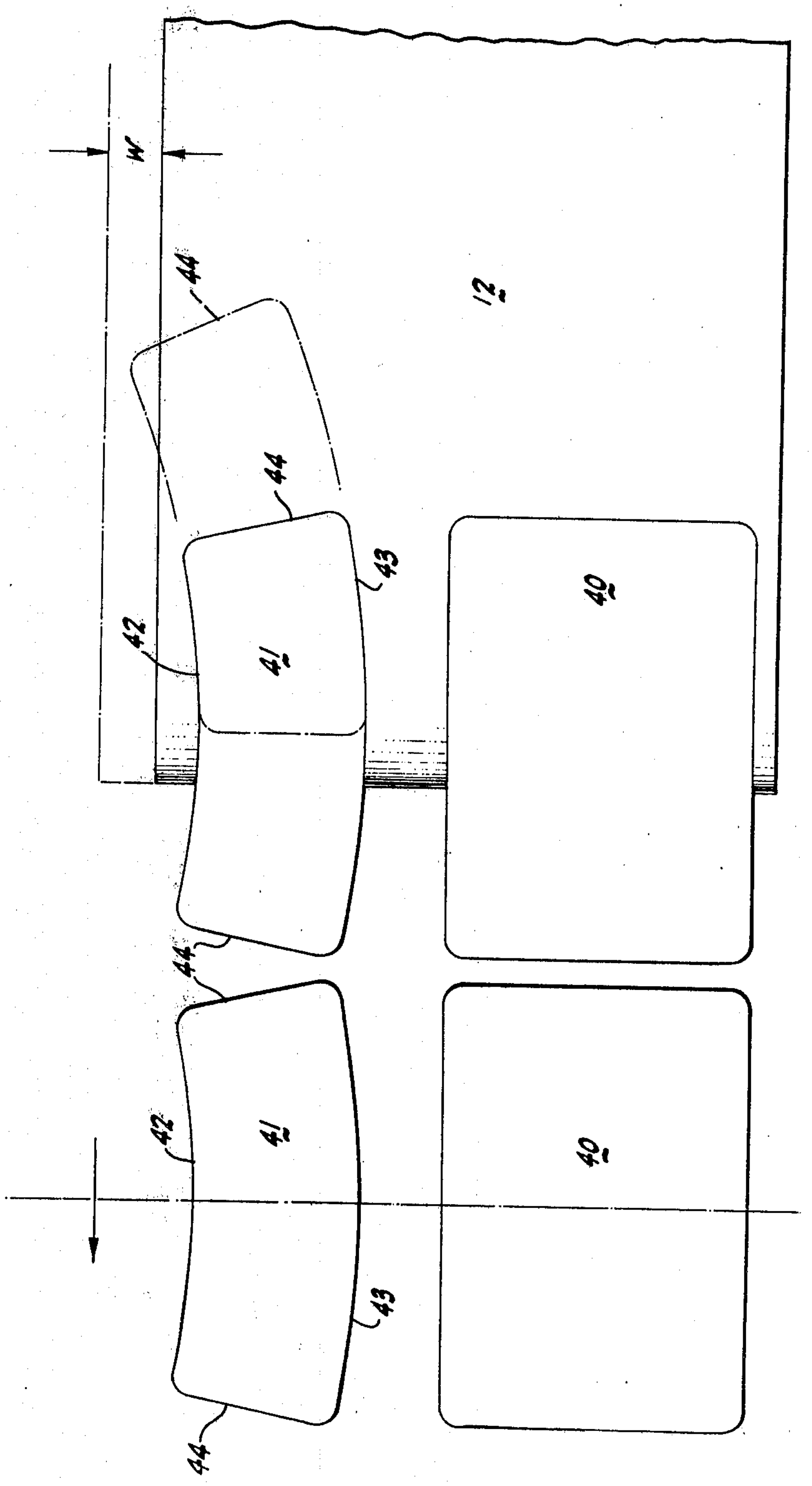
FIG. 2 is a plan view showing a segment of continuous label stock with two labels (a body label and a shoulder label) in the process of severance from continuous label stock, and showing also the position of these labels as they are initially delivered to the vacuum drum of the machine.

Referring now to FIG. 2, the label cutting instrumentality 15 (see FIG. 1) is such that a generally rectangular body label 40 and a generally trapezoidal shoulder label 41 are severed. The shoulder label has a concave top edge 42, a convex bottom edge 43 and sloping, downwardly diverging sides 44, such configuration and the dimensions being adapted to the geometry of the shoulder of the container.

FIG. 2 also illustrates an important aspect of the present invention, namely the economy that it effects in the width of label stock. As will be seen the shoulder label is cut from the label stock parallel to the body label and it is applied to the vacuum drum in that position. Subsequently, as will appear below, before the shoulder label is applied to a container (and after it has passed through the glue station) it is doubly tilted, first about a radial axis. In an alternative embodiment this tilting about a radial axis may be accomplished by cutting the shoulder label on a bias so that it assumes, when it is cut, the position shown in broken lines. As will be apparent, by cutting the shoulder label parallel to the body label, there is a saving of a width of label stock "w", and the requisite tilt is accomplished after the shoulder label is applied to the vacuum drum.

As shown in FIG. 2, both labels are spaced somewhat inwardly of the edges of the label stock. They may be cut adjacent these edges thereby effecting a further saving of label stock but the resulting scrap material is not as easily disposed of and the desired pull on the continuous scrap material by the roller 20 is lost. The spacing between the body label 40 and the shoulder label 41 is determined by the spacing between these labels on the container.

Figures 3, 4:
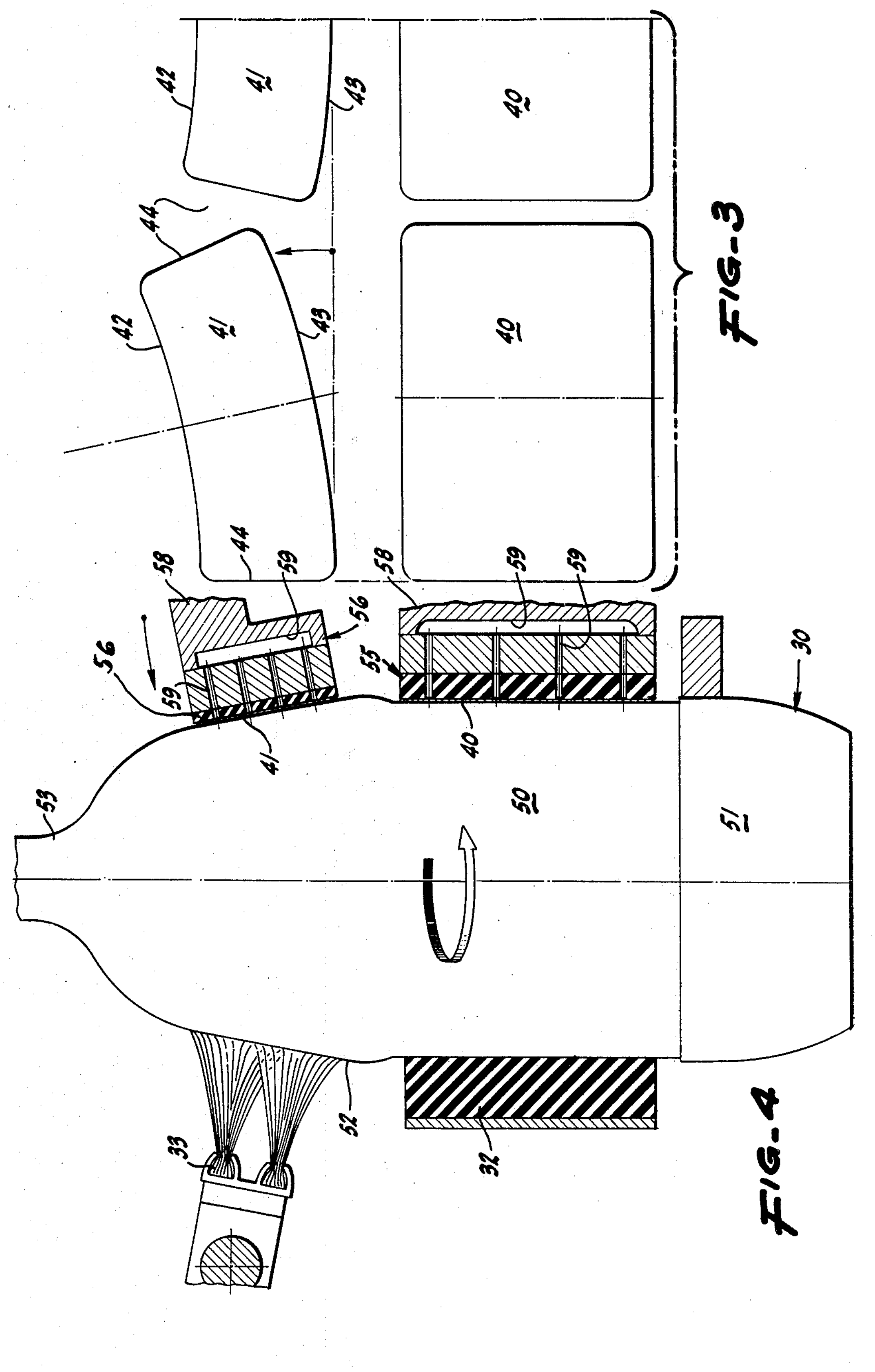
FIG. 3 is a view showing a body label and a shoulder label in their geometric relationship as delivered to the vacuum drum and then, to the left, with the shoulder label tilted.
FIG. 4 is a view in side elevation of a typical container having a cylindrical body and a conical shoulder and showing a body pad applying a body label to the cylindrical body of the container and a shoulder pad applying a shoulder label to the tapered shoulder of the container, the two pads being shown in cross section.

Referring now to FIGS. 3 and 4, in FIG. 3 a shoulder label 41 is shown tilted about a first axis and in FIG. 4 it is shown tilted also about a second axis to bring it into the proper attitude for application to the shoulder of a container. A typical container is shown having a cylindrical body portion 50, a base cup (explained hereinbelow) 51, a tapered shoulder 52 and a neck 53. The container illustrated is what is known as a PET (signifying polyethylene terephthalate) container. Such containers are blow molded giving them, therefore, a rounded bottom which does not provide stability. For that reason a plastic base cup 51 is provided. It will be understood that other types and shapes of container, e.g. plastic, glass, metal, etc., may take the place of the particular container 30 shown in FIG. 4.

Figure 7:
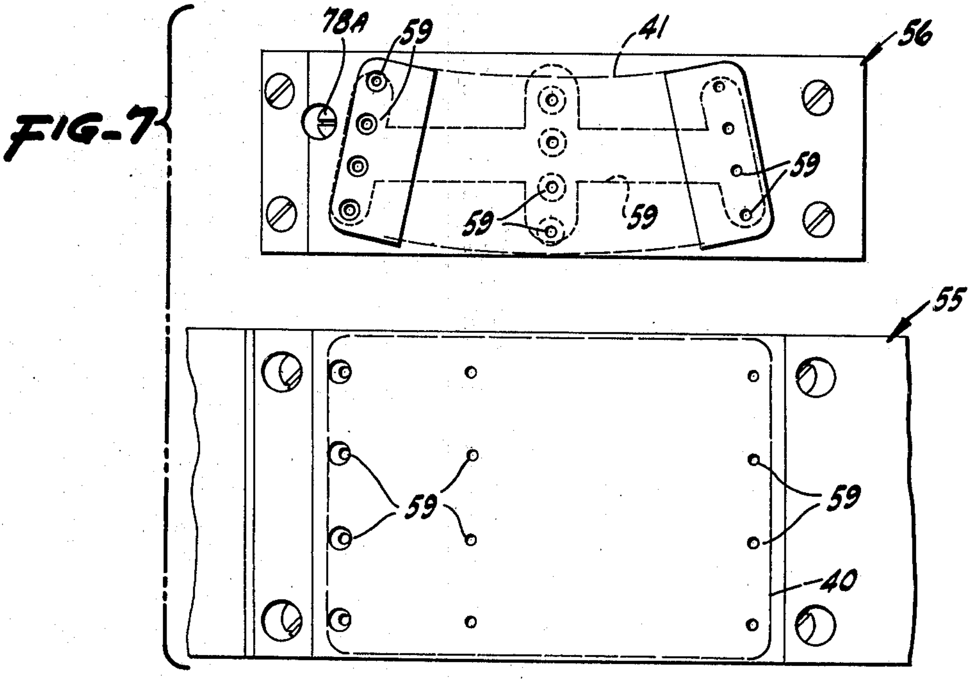
FIG. 7 is a view in elevation of a body pad and a shoulder pad.

In FIG. 4 there is shown a body pad 55 and a shoulder pad 56. The body pad is provided with a support 58 to which a resilient exposed layer of material (the "pad" proper) is secured, suction passages 59 being provided for application of vacuum. Except for its shape, size and biaxial mounting, the shoulder pad 56 is of identical construction and similar parts are similarly numbered. Front or elevational views of a body pad 55 and a shoulder pad 56 are shown in FIG. 7.

Figure 6:
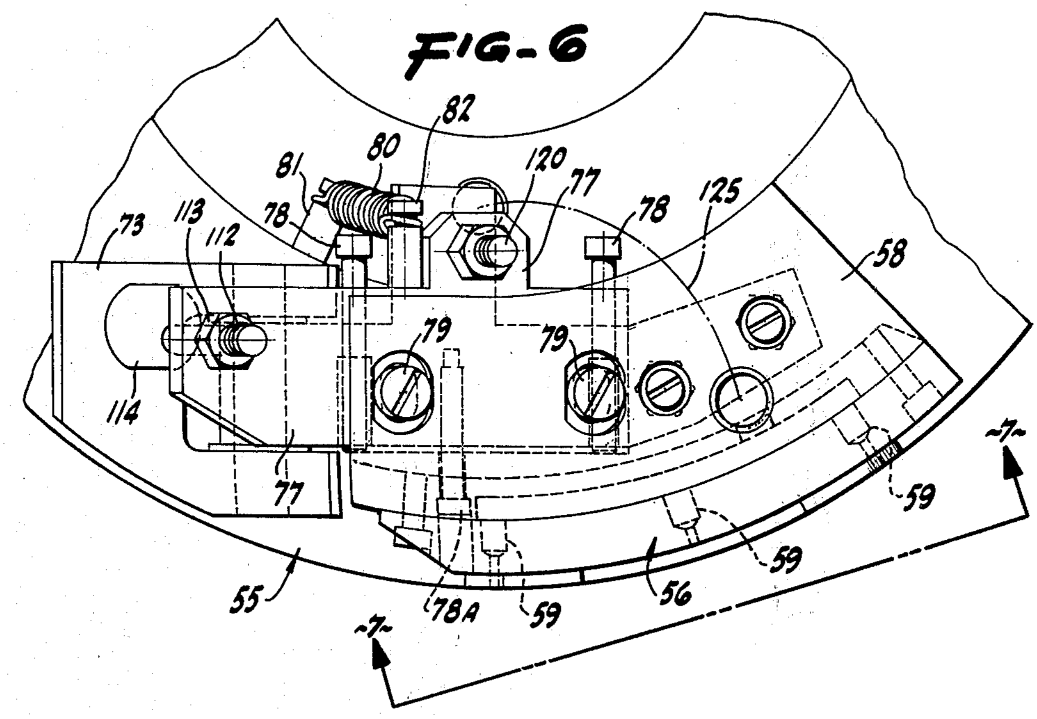
FIG. 6 is a view similar to that in FIG. 5 but on a larger scale and showing only a fragment of the vacuum drum.
Figure 8:
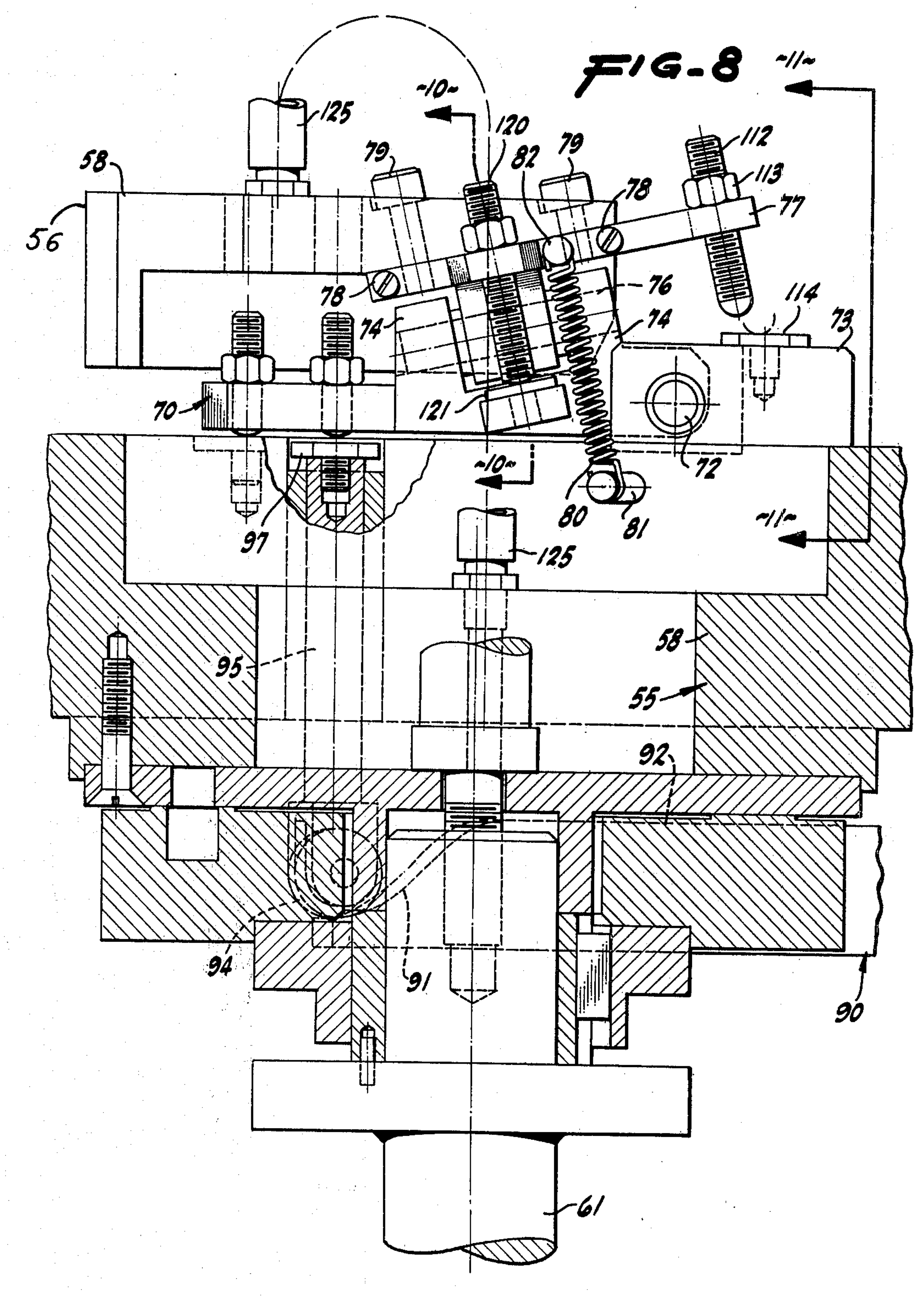
FIG. 8 is a section taken along the line 8—8 of FIG. 5 showing a shoulder pad and its tilting mechanism in their rest position in relation to the corresponding body pad.
Figure 9:
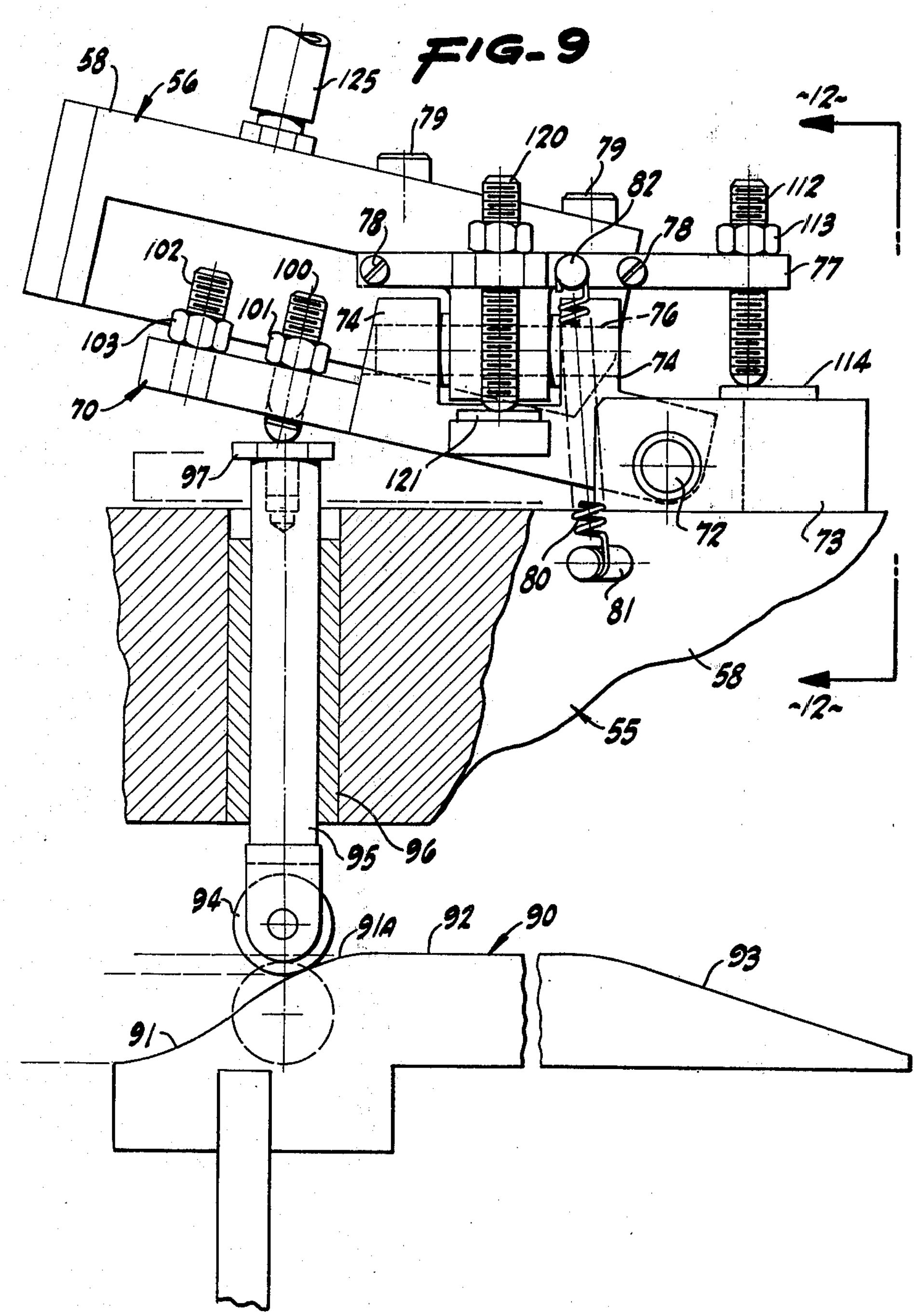
FIG. 9 is a view similar to that of FIG. 8 but showing the shoulder pad in tilted position, such being tilted about one of two axes.
Figure 10:
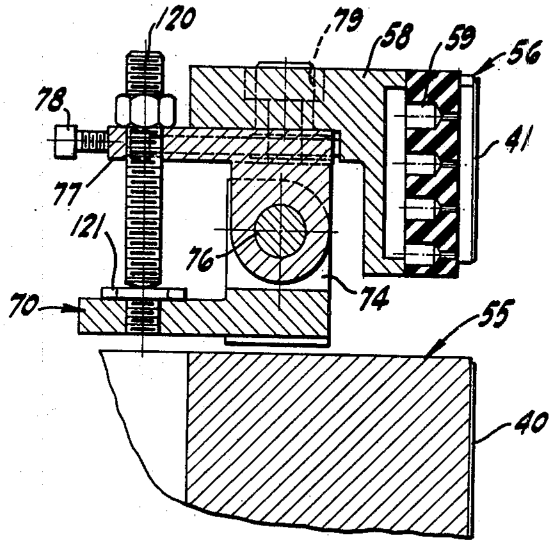
FIG. 10 is a section taken along the line 10—10 of FIG. 8 showing a shoulder pad in its rest position in relation to the corresponding body pad.
Figure 11:
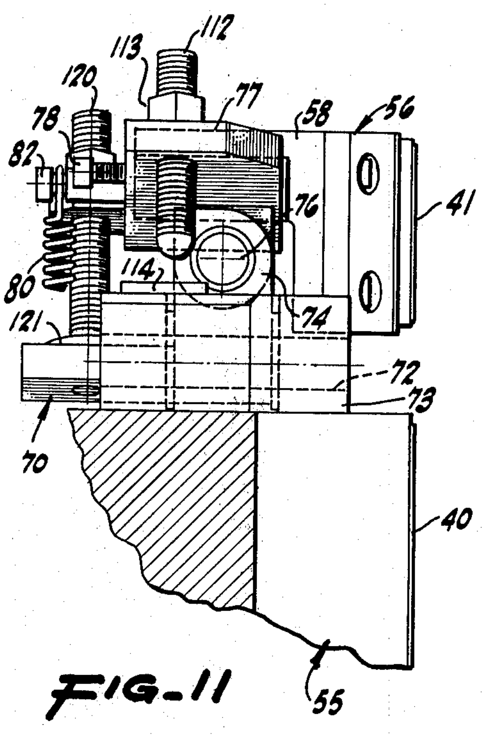
FIG. 11 is a section taken along the line 11—11 of FIG. 8.
Figure 12:
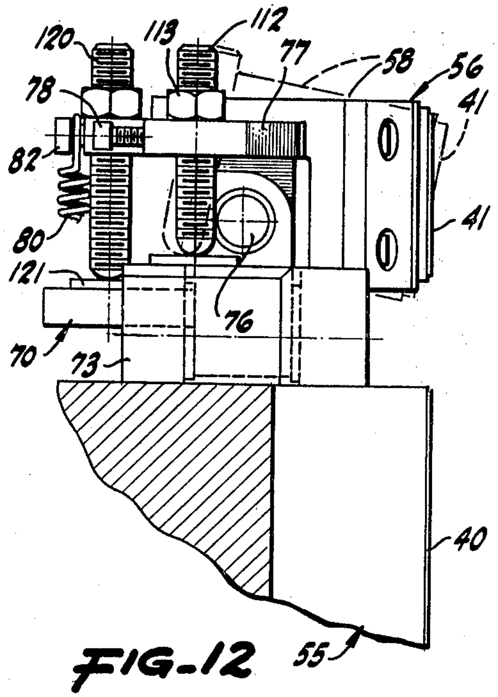
FIG. 12 is a section taken along the line 12—12 of FIG. 9 showing how the shoulder pad is tilted about its second axis.

Referring now to FIGS. 8 and 9 and as needed to FIGS. 10, 11 and 12, the support 58 for shoulder pad 56 is mounted for biaxial movement (in addition to being mounted for movement with the body pad about the axis of drive shaft 61, see FIG. 8) as follows: A bracket 70 is mounted for pivotal movement about the axis of pin 72 carried in a frame bracket 73. This component of movement acts to tilt the pad with a shoulder label attached to it, to the position shown at the left of FIG. 3. This axis will be referred to as the "first" or "radial" axis because the first tilting movement of the label is about this axis and it lies along a radius from the main axis of the vacuum drum. The bracket 70 is formed with a saddle 74 between the legs of which is supported a pivot pin 76. This defines a second axis. Mounted for rotation about this axis is a U-shaped bracket 77 best shown in FIG. 10. The support 58 for shoulder pad 56 is in turn carried by bracket 77. Screws 78 threaded through the bracker 77 bear against an inner surface of the support 58. Screws 78 are employed to locate the pad 56 in the proper radial position, that is to say, at the proper distance from the axis of drive shaft 61. When properly adjusted the pad is clamped in place by means of screws 79. To back off the support 59, as shown in FIG. 6, a screw 78*a* extending through (but not threaded to) the support 58 is threaded into bracket 77. This screw is manipulated for this purpose.

It will be apparent that the pad 56 and with it the shoulder label 41 are capable of rotation about two axes. The first or radial axis is the axis of pin 72 and this component of motion serves to tilt the label to the skewed position shown in FIG. 3. The other component of movement, namely that about the axis of pin 76, (the second axis serves to tilt the pad and with it, the shoulder label to the slanting position shown in FIG. 4 so as to bring the label into contact with the shoulder of the container. The shoulder pad 56 is normally held in its "rest" position shown in FIGS. 8 and 10 by a spring 80 attached at one end to a pin 81 projecting from the support 58 of shoulder pad 56 and at its other end to a pin 82 fixed to the support 59 of the shoulder pad 58. The angle to which shoulder label is tilted is such that as it is applied to the shoulder of a container and the container is rotated, the shoulder label will be properly wrapped (partially) about the container.

Such movements of the pad are affected by a cam mechanism shown in FIG. 9. There is shown a cam 90 which is located in the lower part of the vacuum drum structure and is stationary. It includes a rise portion 91 terminating in a segment 91-A which merges into a horizontal dwell portion 92 which then slopes downwardly at 93. A cam follower roller 94 rides on this cam once during each revolution of the vacuum drum and acts to move a rod 95 upwardly as it ascends the rise 91 and 91-A and to hold the rod in its upper position while it rides on dwell 92 and then lowers the rod when it rides down the decline 93. The spring 80 serves to return the rod 95 to its lower position. The rod 95 slides in a bushing 96 and has at its upper end a plate or cap 97. A screw 100 having a rounded lower end is threaded through the bracket 70 and is locked in adjusted position by a lock nut 101. Movement of the rod 95 during travel of the roller 94 along the incline or rise 91 operates to tilt the bracket 70 from its horizontal rest position shown in FIG. 8 to the tilted or inclined position shown in FIG. 9. The rest position of the bracket 70 is determined by adjustment of a screw 102 which is locked in adjusted position by a lock nut 103.

The degree to which the bracket 70 is pivoted, therefore the angle which the label assumes when fully tilted about the first axis is determined by a screw 112 threaded through the upper portion of the bracket 77 and locked in adjusted position by lock nut 113. When, as shown in FIG. 9, the screw 112 bottoms against a plate 114, such motion is halted but at this instant the cam follower roller continues on up the last segment 91-A of the rise of the cam 90. Accordingly the rod 95 is pushed upwardly another increment as shown in broken lines in FIG. 9. The result of this last increment of motion of rod 95 results in slippage of the lower rounded end of pin 112 on the plate 114 and therefore rotation of bracket 77 and with it support 58, shoulder pad 56 and the shoulder label 41 about the axis of pin 76.

The dwell 92 of cam 90 is so located and is of such length that the shoulder label is held in this doubly tilted position as it is applied to the shoulder of a container. Thereafter, as cam follower roller 94 goes down the decline 93 of cam 90, the spring 80 serves to return the pad 56 and its mounting means to the rest position shown in FIG. 8. A screw 120 threaded through bracket 77 bottoms on a plate 121.

As noted above, a vacuum or suction system is incorporated in the labeling machine, parts of which are shown at 59 in FIGS. 4 and 6, the function of which is to apply suction to grip each body label and shoulder label on the respective pads as they are delivered by the label feed and cutter, to hold each label during transport past the glue applicator and to the labeling station and to release the labels at the labeling station. This system is conventional except that flexible hoses are provided at 125 (see FIGS.8 and 9) to allow tilting of the shoulder pads without breaking the suction.

Further, although for reasons stated above it is preferred to sever shoulder labels from the label stock parallel to the body labels, and then tilt them about the first axis, it is possible and within the scope of the invention to sever the labels on a bias so that they require only tilting about the second axis. In that case, and referring to FIGS. 9 and 12, the shoulder pad and its support will be mounted permanently in the tilted positions shown in FIG. 8 but will be mounted for movement about the axis of pin 76. In that case the cam 90, rod 95 construction will be modified to effect only such tilting movement.

Figure 5:
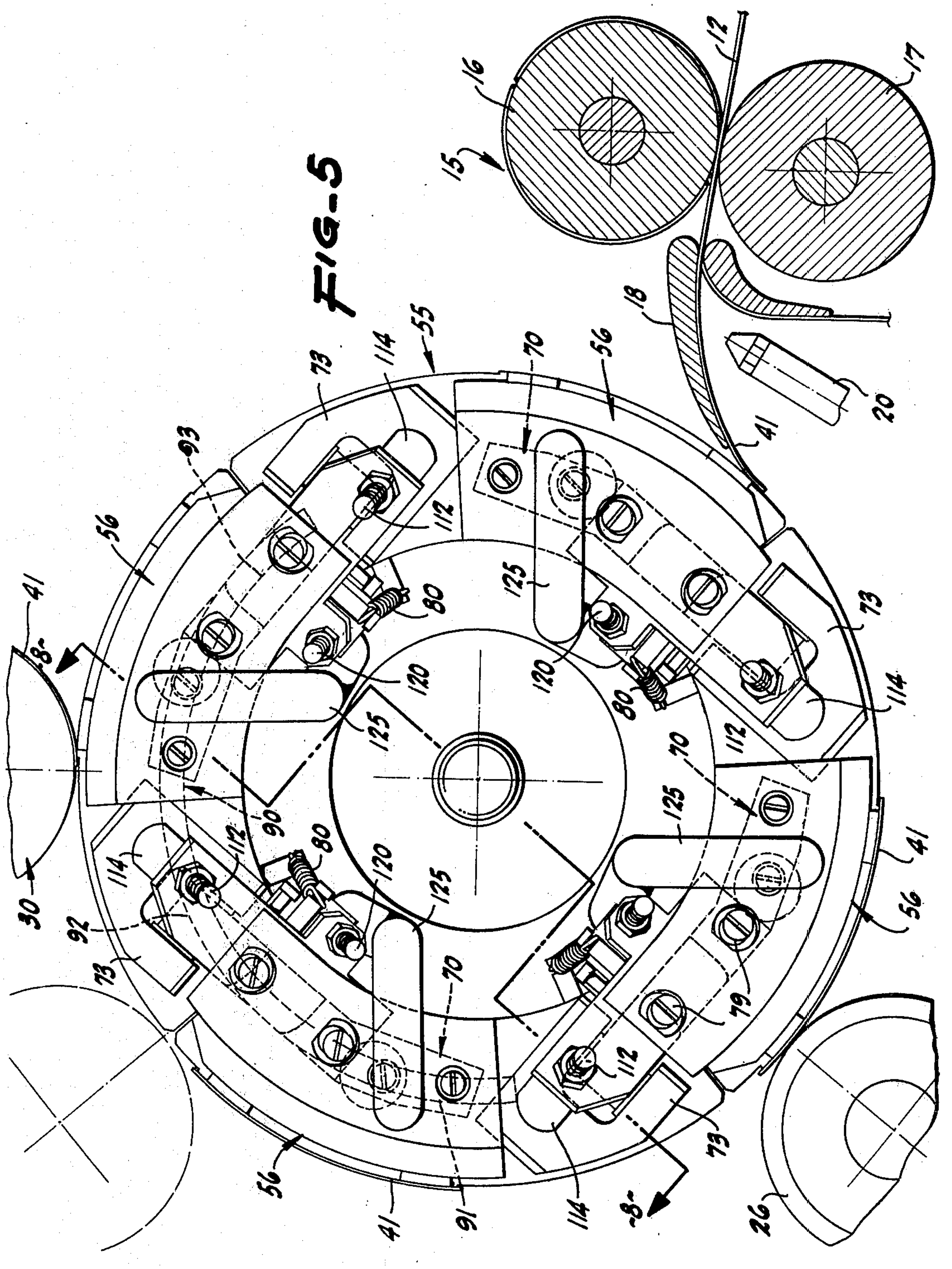
FIG. 5 is a top plan view of the vacuum label drum with the label cutting instrumentality shown in cross section.

It has been found to be advantageous to install a freely rotating roller (not shown) at the position where the shoulder label 41 first comes into contact with the shoulder pad 56. Referring to FIG. 5, this roller is located in the area between the jet 20, the guide 18 and that portion of the vacuum drum 25 where the shoulder pads 56 are located, and in a position such that this roller will contact the shoulder label on the shoulder pad just before the label is severed. This roller is mounted on a bracket to pivot about an axis parallel to the vacuum drum axis and is adjustably biased by a spring so as to contact the shoulder label and press it against the shoulder pad.

It will be apparent that shoulder labels alone may be applied to containers in which event the body pads 40 will be eliminated, or they may be present on a second, body labeling machine.

It will therefore be apparent that new, useful and advantageous labeling machine and method have been provided.

I claim:

1. In apparatus for applying segments of flexible sheet material to articles and comprising a rotary transport rotating about a fixed main axis and comprising at least one sector having a cylindrical peripheral surface concentric to said main axis and equipped with means adapted to grip such segments in succession at a segment receiving station, to hold each segment during transport from such station to a segment applying station and to release each segment to an article at the segment applying station, the improvement which comprises (a) means mounting said sector for movement about two tilt axes, one such axis (the first axis) being radial with respect to said transport, the other such axis (the second axis) being perpendicular to the first axis, and (b) tilt operating means operating during each revolution of the transport to cause such sector to undergo a cycle commencing at a start position at the segment receiving station at which the sector is concentric to said main axis, then the sector is rotated about both its first and second axes to assume the desired attitude at the segment applying station and then the sector is rotated back to its start position.

2. The improvement of claim 1 wherein said operating means comprises a stationary cam and cam follower means acting to cause the sector to undergo tilting about its first tilt axis and then about its second tilt axis and to hold the sector in the resulting position during segment application at the segment applying station and then to return the sector to its original position.

3. In a labeling machine comprising a continuous label feed for continuous supply of a continuous label stock, cutting means to sever the label stock into individual labels, a rotary vacuum drum having at least one sector which is normally concentric to the drum axis and which is provided with vacuum means to adhere each severed label as received from the cutting means and to hold the label and transport it from a label applying station in proximity to a container feed and to release each label to a container at the label applying station, the improvement which comprises a pair of pads carried by each sector including a lower body label pad and an upper shoulder label pad, said pads being provided with such vacuum means, said body label pad being concentric to the drum axis and located at a fixed radial distance from such axis and presenting at all times a segment of a cylindrical surface concentric to the drum axis, said shoulder label pad being mounted for movement about two tilt axes between a first position wherein the shoulder pad is concentric to the drum axis and presents a segment of a cylindrical surface concentric to such axis and a second position wherein the pad is inclined with respect to the drum axis to present a label adhered thereto to the conical surface of the shoulder of a container and is also rotated about an axis which is radial to the drum, and operating means acting to cause the shoulder pad to undergo a cycle of movement during each revolution of the drum between said first position at the label receiving station, said second position at the label applying station and back to the first position at the label receiving station, said operating means being such that the shoulder pad undergoes a compound movement during each cycle including a tilting movement about an axis which is radial with respect to the drum axis and a second tilting movement about an axis which is perpendicular to the first tilt axis.

4. The improvement of claim 3 wherein the label cutter serves to sever simultaneously from a continuous length of label stock a lower body label and an upper shoulder label spaced above the body label a distance conforming to the intended spacing of the body label and the shoulder label on the container, said shoulder label having a generally trapezoidal shape including non-parallel ends, an upper, shorter concave side edge and a lower, longer convex side edge, said shoulder label being located on the continuous label stock, and on the drum prior to such tilting movements, generally parallel to the body label.

5. A label drum rotating about a fixed drum axis and adapted to apply labels to conical shoulders of containers comprising a pad equipped with vacuum means adapted to grip and hold a label supplied thereto at a label receiving station, to transport the label so held to a label applying station, to release the label at the label applying station to a container, and to return to the label receiving station; a first means mounting the pad for pivoting about a first tilt axis which is radial with respect to the drum axis, said first mounting means being carried by the drum for rotation with the drum about the drum axis, a second mounting means carried by the first mounting means and directly mounting the pad for pivoting about a second tilt axis which is perpendicular to the first tilt axis, means normally holding the pad in a position such that it is concentric to the drum axis and operating means acting against such holding means to cause the pad during each revolution of the drum to undergo a cycle in which the pad is pivoted about both tilt axes between the label receiving station and the label applying station and is held in the resulting tilted position at the label applying station, and returns to its initial, untilted position at the label receiving station.

* * * * *